June 18, 1935. H. SCHILDKNECHT 2,005,269
CLUTCH OPERATING MECHANISM
Filed April 5, 1933
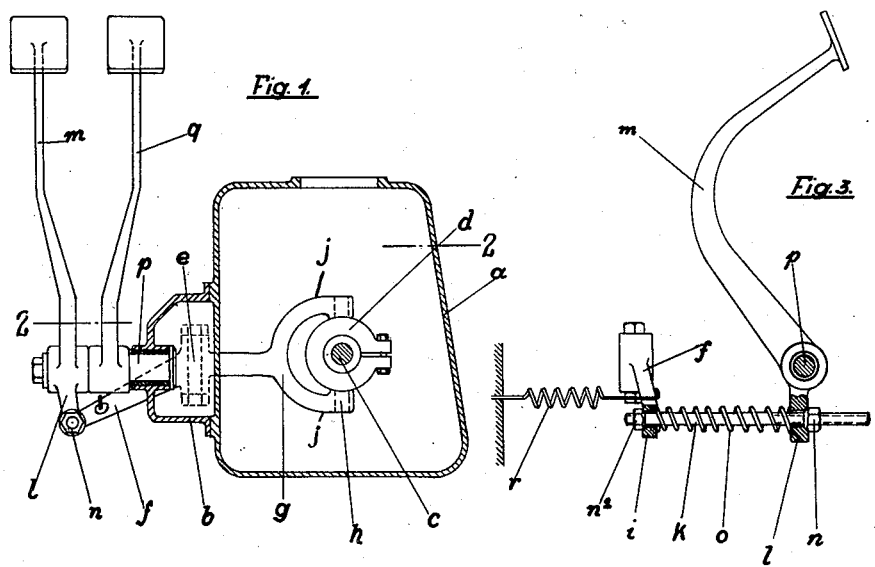
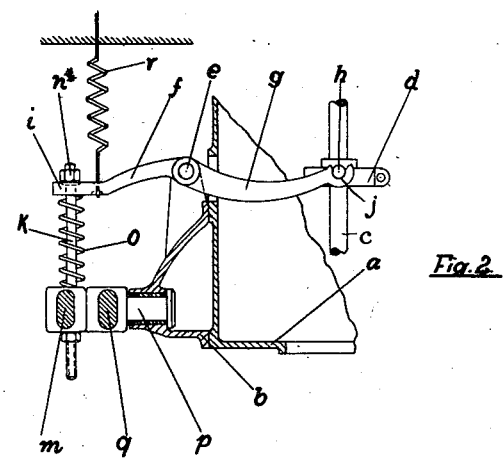
Inventor
H. Schildknecht Patented June 18, 1935

2,005,269

UNITED STATES PATENT OFFICE 2,005,269

CLUTCH OPERATING MECHANISM

Heinrich Schildknecht, Gaggenau, Germany, assignor to Daimler-Benz Aktiengesellschaft, Stuttgart-Unterturkheim, Germany, a German company Application April 5, 1933, Serial No. 664,624
In Germany April 9, 1932

4 Claims. (Cl. 192—99)

The invention relates to a suitable and simple arrangement of a clutch operating mechanism, especially for a power-driven vehicle, and has for its main object a suitable arrangement of the clutch operating lever and a separate pedal on the same side of the clutch casing. For this purpose, the clutch operating lever is preferably fulcrumed on a vertical axis on the outside of the casing, said lever projecting through an opening into the casing.

The invention has for a principal advantage, that the shaft for the clutch operating lever does not extend through the whole casing thereby securing a simple mounting of the clutch. Furthermore the whole controlling mechanism may be mounted as a whole on the outside of the clutch casing.

An example of this invention is shown diagrammatically in the accompanying drawing.

Figure 1 is a front elevation, partly in section,

Figure 2 is a sectional view on lines 2—2 of the Fig. 1,

Figure 3 is a side elevation of the clutch controlling mechanism with the casing removed.

$a$ is the clutch casing, which is provided with a lateral bearing member $b$ detachably secured to the casing $a$ on one side of the latter, $c$ is the shaft driven by the vehicle engine. On this shaft there is shiftably mounted a sleeve $d$ controlling the usual engine clutch (not shown) which is engaged in a usual manner for instance by a spring (also not shown).

A double-armed lever $f$ pivoted on a vertical shaft $e$ mounted on the lateral bearing member $b$ is inserted into the clutch casing through an opening in the side-wall of the clutch casing and has a forked arm $g$, the fork ends constituting abutment members and having arcuate bearing surfaces $j$, the clutch member $d$ having abutment means comprising vertically disposed pins $h$ for co-operation with the abutment means of the arm $g$. The location of the abutment means on the arm $g$ and clutch member $d$ is such that when the arm is inserted into the clutch casing through the opening the abutment means come into operative engagement, so that the lever $f$ can act from one side on the clutch sleeve $d$ and by pressing the arm $g$ against the pins $h$ the sleeve $d$ moves axially on the shaft $c$ and disengages the engine clutch (not shown). The end $i$ of the other arm of the lever $f$ is connected to the lever arm $l$ of the foot pedal $m$ by means of a rod $k$ passing through openings of the lever and the pedal-arm. Nuts $n$—$n'$ are fixed or screwed to the ends of the rod the nuts serving as abutments against which the lever arm $i$ or the pedal arm $l$ are pressed by a spring $o$. By adjusting the nuts, the distance between the lever and the pedal may be varied. The nuts or abutments partly are ball-shaped bearing against corresponding recesses in the lever or the pedal, in such a manner that the difference of movement of these two elements may be compensated.

The clutch pedal $m$ is mounted at a pivot $p$ fixed in the casing member $b$. The pin $p$ carries also the brake pedal $q$. Both pedals and the lever $f$ may be mounted together with the casing member $b$ as a unit at the side of the clutch casing $a$. A spring $r$ causes the mechanism to return into the normal position when the clutch pedal is released.

The mode of operation of the mechanism is as follows: If the clutch is to be put out of operation then the driver depresses the pedal $m$ so as to turn the latter around the pivot $p$ in the anticlockwise direction in Fig. 3. The lever $l$ pulls the rod $k$ to the right (in Fig. 3) since it bears against the nut $n$ screwed on the rod. By this means the nut $n'$ on the forward side of the rod which bears against the left hand arm $i$ of the lever $f$ draws this arm of the lever rearwardly and rocks the lever about the vertical shaft $e$, whereby the other arm $g$ of the lever $f$, the arcuate bearing surfaces $j$ of the forked ends of which bear against the pins $h$, forces the clutch member $d$ forwardly, thereby disengaging the clutch in the well known manner. If the clutch pedal is again released it moves back into its original position under the action of the spring $r$, the lever $f$ at the same time following this movement and the arm $g$ allowing the clutch member $d$, the pins $h$ of which are held continuously in engagement with the arcuate abutment members $j$ under the action of the clutch spring or springs (not shown), to move into the operative position to place the clutch into engagement.

I claim:

1. A clutch operating mechanism for power driven vehicles comprising in combination a clutch casing, a clutch pedal pivoted on the side of said casing, a clutch lever pivotally mounted on the outside of the clutch casing at the side of said clutch pedal with its pivotal-axis vertical, said clutch lever having an arm formed to engage clutch operating means inside the casing and the clutch casing having an opening therein through which said arm extends from the outside into the interior of the clutch casing, and a connecting rod operatively connected to the clutch pedal and clutch lever for turning said lever about the said vertical axis on the clutch pedal being actuated.

2. A clutch operating mechanism for power driven vehicles comprising in combination a clutch casing, a clutch pedal, a clutch shaft having a clutch operating sleeve slidable thereon, a clutch lever operatively connected to the clutch pedal said clutch lever pivotally mounted on the outside of the clutch casing with its pivotal axis vertical, said clutch casing having an opening therein in proximity to the pivotal axis of the clutch lever and the clutch lever having an arm extending from the pivotal axis of the clutch lever through said opening into the interior of the clutch casing, said arm and clutch operating sleeve having abutment means thereon located so as to come into operative engagement when the arm is inserted into the clutch casing through said opening.

3. A clutch operating mechanism for power driven vehicles comprising in combination a clutch casing, a lateral bearing member secured to the clutch casing, on the outside thereof, a horizontal pivot on said bearing member, a clutch pedal pivoted on said horizontal pivot, a vertical pivot on the bearing member, a clutch lever operatively connected to the clutch pedal said clutch lever being pivoted on said vertical pivot, said clutch casing having an opening therein in proximity to the vertical pivot and the clutch lever having an arm extending from the vertical pivot through said opening into the interior of the clutch casing, said arm formed to engage clutch operating means inside the casing.

4. A clutch operating mechanism for power driven vehicles comprising in combination a clutch casing, a clutch pedal, a clutch shaft having a clutch operating sleeve slidable thereon, vertical pins on the clutch operating sleeve, a clutch lever operatively connected to the clutch pedal, said clutch lever pivotally mounted on the outside of the clutch casing with its pivotal axis vertical, said clutch casing having an opening therein in proximity to the pivotal axis of the clutch lever to allow the clutch lever to be inserted into the clutch casing from the outside and the clutch lever having a forked arm extending from the pivotal axis of the clutch lever through said opening into the interior of the clutch casing, the forked ends of said arm and the pins on the clutch operating sleeve being located so as to come into operative engagement when the arm is inserted into the clutch casing through said opening.

HEINRICH SCHILDKNECHT.